(12) United States Patent
Zones et al.

(10) Patent No.: US 11,186,491 B2
(45) Date of Patent: Nov. 30, 2021

(54) MOLECULAR SIEVE SSZ-117, ITS SYNTHESIS AND USE

(71) Applicant: CHEVRON U.S.A. INC., San Ramon, CA (US)

(72) Inventors: Stacey Ian Zones, San Francisco, CA (US); Dan Xie, El Cerrito, CA (US); Cong-Yan Chen, Kensington, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 17/023,662

(22) Filed: Sep. 17, 2020

(65) Prior Publication Data

US 2021/0221696 A1    Jul. 22, 2021

Related U.S. Application Data

(60) Provisional application No. 62/962,015, filed on Jan. 16, 2020.

(51) Int. Cl.
| | | |
|---|---|---|
| *C01B 39/48* | (2006.01) | |
| *B01J 29/70* | (2006.01) | |
| *B01J 29/04* | (2006.01) | |

(52) U.S. Cl.
CPC ............. *C01B 39/48* (2013.01); *B01J 29/047* (2013.01); *B01J 29/70* (2013.01); *C01P 2002/72* (2013.01); *C01P 2004/03* (2013.01)

(58) Field of Classification Search
CPC ......... B01J 29/047; B01J 29/70; C01B 39/48; C01P 2002/72; C01P 2004/03
See application file for complete search history.

(56) References Cited

U.S. PATENT DOCUMENTS

| | | | |
|---|---|---|---|
| 7,344,696 B2* | 3/2008 | Canos ..................... | C01B 39/06 423/702 |
| 8,361,436 B2* | 1/2013 | Lorgouilloux .......... | C01B 39/06 423/718 |
| 2018/0215699 A1 | 8/2018 | Humbert et al. | |

OTHER PUBLICATIONS

Valeryia Kasneryk, et al, "Consecutive interlayer disassembly-reassembly during alumination of UOV zeolites: insight into the mechanism", | J. Mater. Chem. A, 2017, 5, 22576-22587 (Year: 2017).*

Castaneda et al., "Synthesis of a New Zeolite Structure ITQ-24, with Intersecting 10- and 12-Membered Ring Pores", J. Am. Chem. Soc. 2003, 125, 26, 7820-7821 (Year: 2003).*

* cited by examiner

*Primary Examiner* — David M Brunsman

(57) ABSTRACT

A novel synthetic crystalline aluminogermanosilicate molecular sieve material, designated SSZ-117, is provided. SSZ-117 can be synthesized using N,N,N,3,5-pentamethyl-adamantan-1-ammonium cations as a structure directing agent. SSZ-117 may be used in organic compound conversion reactions and/or sorptive processes.

13 Claims, 1 Drawing Sheet

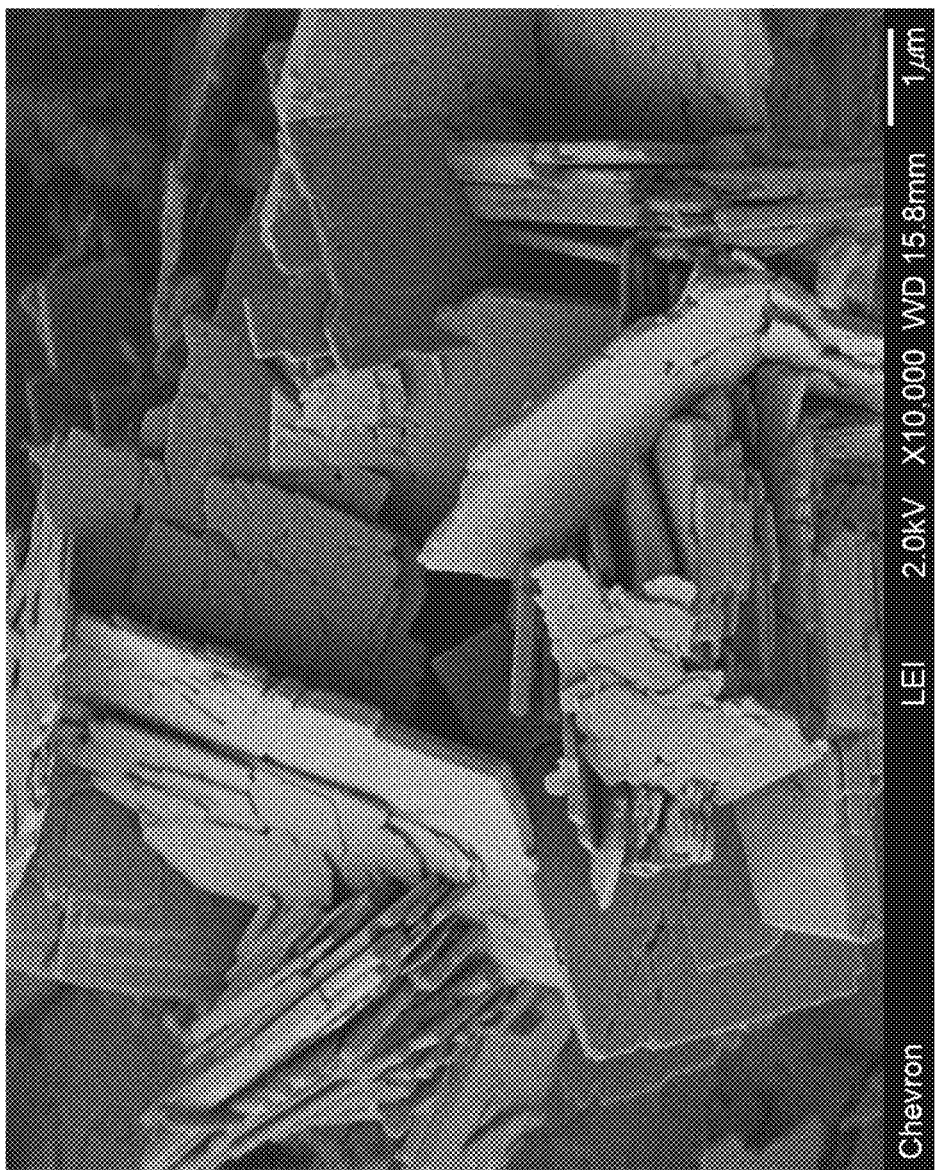

MOLECULAR SIEVE SSZ-117, ITS SYNTHESIS AND USE

FIELD

This disclosure relates to a novel synthetic crystalline molecular sieve designated SSZ-117, its synthesis, and its use in organic compound conversion reactions and sorption processes.

BACKGROUND

Molecular sieves are a commercially important class of materials that have distinct crystal structures with defined pore structures that are shown by distinct X-ray diffraction (XRD) patterns and have specific chemical compositions. The crystal structure defines cavities and pores that are characteristic of the specific type of molecular sieve.

According to the present disclosure, a new crystalline molecular sieve, designated SSZ-117 and having a unique powder X-ray diffraction pattern, has been synthesized using N,N,N,3,5-pentamethyladamantan-1-ammonium cations as a structure directing agent.

SUMMARY

In one aspect, there is provided a molecular sieve having, in its as-synthesized form, a powder X-ray diffraction pattern including at least the peaks in Table 3 below.

In its as-synthesized and anhydrous form, the molecular sieve can have a chemical composition comprising the following molar relationship:

|  | Typical | Preferred |
| --- | --- | --- |
| $TO_2/Al_2O_3$ | ≥30 | ≥50 |
| $Q^+/TO_2$ | >0 to 0.1 | >0 to 0.1 | wherein T is a tetravalent element comprising silicon and germanium; and $Q^+$ comprises N,N,N,3,5-pentamethyladamantan-1-ammonium cations.

In another aspect, there is provided a molecular sieve having, in its calcined form, a powder X-ray diffraction pattern including at least the peaks in Table 4 below.

In its calcined form, the molecular sieve can have a chemical composition comprising the following molar relationship:

$Al_2O_3$:(n)$TO_2$ wherein n is ≥30; and T is a tetravalent element comprising silicon and germanium.

In a further aspect, there is provided a method of synthesizing the molecular sieve described herein, the method comprising (a) providing a reaction mixture comprising: (1) a FAU framework type zeolite; (2) a source of germanium; (3) N,N,N,3,5-pentamethyladamantan-1-ammonium hydroxide (Q); (4) a source of fluoride ions; and (5) water; and (b) subjecting the reaction mixture to crystallization conditions sufficient to form crystals of the molecular sieve.

In yet a further aspect, there is provided a process of converting a feedstock comprising an organic compound to a conversion product which comprises contacting the feedstock at organic compound conversion conditions with a catalyst comprising the molecular sieve described herein.

BRIEF DESCRIPTION OF THE DRAWINGS

FIG. 1 shows a Scanning Electron Micrograph (SEM) image of the as-synthesized product of Example 8.

DETAILED DESCRIPTION

Definitions

The term "framework type" has the meaning described in the "Atlas of Zeolite Framework Types," by Ch. Baerlocher and L. B. McCusker and D. H. Olsen (Elsevier, Sixth Revised Edition, 2007).

The term "zeolite" refers a synthetic aluminosilicate molecular sieve having a framework constructed of alumina and silica (i.e., repeating $SiO_4$ and $AlO_4$ tetrahedral units).

The term "aluminogermanosilicate" refers to a crystalline microporous solid including aluminum, germanium and silicon oxides within its framework structure. The aluminogermanosilicate may be a "pure-aluminogermanosilicate" (i.e., absent other detectable metal oxides with its framework structure) or optionally substituted. When described as "optionally substituted," the respective framework may contain other atoms (e.g., B, Ga, In, Fe, Ti, Zr) substituted for one or more of the atoms not already present in the parent framework.

The term "as-synthesized" is employed herein to refer to a molecular sieve in its form after crystallization, prior to removal of the structure directing agent.

The term "anhydrous" is employed herein to refer to a molecular sieve substantially devoid of both physically adsorbed and chemically adsorbed water.

As used herein, the numbering scheme for the Periodic Table Groups is as disclosed in Chem. Eng. News 1985, 63(5), 26-27.

Synthesis of the Molecular Sieve

Molecular sieve SSZ-117 can be synthesized by: (a) providing a reaction mixture comprising (1) a FAU framework type zeolite; (2) a source of germanium; (3) N,N,N,3,5-pentamethyladamantan-1-ammonium hydroxide (Q); (4) a source of fluoride ions; and (5) water; and (b) subjecting the reaction mixture to crystallization conditions sufficient to form crystals of the molecular sieve.

The reaction mixture can have a composition, in terms of molar ratios, within the ranges set forth in Table 1:

TABLE 1

| Reactants | Typical | Preferred |
| --- | --- | --- |
| $TO_2/Al_2O_3$ | 30 to 600 | 60 to 500 |
| $Q/TO_2$ | 0.10 to 1.00 | 0.20 to 0.70 |
| $F/TO_2$ | 0.10 to 1.00 | 0.20 to 0.70 |
| $H_2O/TO_2$ | 2 to 10 | 4 to 8 | wherein T and Q are as described herein above.

The FAU framework type zeolite can have a $SiO_2/Al_2O_3$ molar ratio of at least 30 (e.g., 30 to 500, 60 to 500, 80 to 500, 100 to 500, 30 to 100, 60 to 100, 80 to 500, or 80 to 100). The FAU framework type zeolite can comprise two or more FAU framework type zeolites having different $SiO_2/Al_2O_3$ molar ratios. The FAU framework type zeolite can be zeolite Y.

Sources of germanium can include germanium oxide and germanium alkoxides (e.g., germanium ethoxide, germanium isopropoxide).

Silicon and germanium may be present in the reaction mixture in a $SiO_2/GeO_2$ molar ratio of 4 to 12 (e.g., 6 to 10).

Sources of fluoride ions can include hydrogen fluoride, ammonium fluoride, and ammonium bifluoride.

SSZ-117 is synthesized using a structure directing agent comprising N,N,N,3,5-pentamethyladamantan-1-ammonium cations ($Q^+$), represented by the following structure (1):

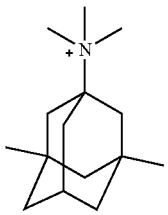

(1)

The reaction mixture typically has a Q/F molar ratio in a range of 0.80 to 1.20 (e.g., 0.85 to 1.15, 0.90 to 1.10, 0.95 to 1.05, or 1 to 1).

The reaction mixture can contain seeds of a molecular sieve material, such as SSZ-117 from a previous synthesis, in an amount of from 0.01 to 10,000 ppm by weight (e.g., 100 to 5000 ppm by weight) of the reaction mixture. Seeding can be advantageous in decreasing the amount of time necessary for complete crystallization to occur. In addition, seeding can lead to an increased purity of the product obtained by promoting the nucleation and/or formation of SSZ-117 over any undesired phases.

It is noted that the reaction mixture components can be supplied by more than one source. Also, two or more reaction components can be provided by one source. The reaction mixture can be prepared either batchwise or continuously.

Crystallization and Post-Synthesis Treatment

Crystallization of the molecular sieve from the above reaction mixture can be carried out under either static, tumbled or stirred conditions in a suitable reactor vessel (e.g., a polypropylene jar or a Teflon™-lined or stainless-steel autoclave) at a temperature of from 125° C. to 200° C. (e.g., 150° C. to 170° C.) for a time sufficient for crystallization to occur at the temperature used (e.g., 1 day to 20 days, or 2 days to 10 days). The hydrothermal crystallization process is typically conducted under pressure, such as in an autoclave, and is preferably under autogenous pressure.

Once the molecular sieve crystals have formed, the solid product can be recovered from the reaction mixture by standard mechanical separation techniques such as centrifugation or filtration. The recovered crystals are water-washed and then dried to obtain the as-synthesized molecular sieve crystals. The drying step can be performed at an elevated temperature (e.g., 75° C. to 150° C.) for several hours (e.g., about 4 to 24 hours). The drying step can be performed under vacuum or at atmospheric pressure.

As a result of the crystallization process, the recovered crystalline molecular sieve product contains within its pore structure at least a portion of the structure directing agent used in the synthesis.

The as-synthesized molecular sieve may be subjected to treatment to remove part or all of the structure directing agent used in its synthesis. Removal of the structure directing agent may be carried out by thermal treatment (e.g., calcination) in which the as-synthesized molecular sieve is heated at a temperature sufficient to remove part or all of the structure directing agent. While sub-atmospheric pressure may be used for the thermal treatment, atmospheric pressure is desired for reasons of convenience. The thermal treatment may be performed at a temperature at least 370° C. for at least a minute and generally not longer than 20 hours (e.g., from 1 to 12 hours). The thermal treatment can be performed at a temperature of up to 925° C. For example, the thermal treatment may be conducted at a temperature of 400° C. to 600° C. in the presence of an oxygen-containing gas. Additionally or alternatively, the structure directing agent may be removed by treatment with ozone.

Any extra-framework metal cations in the molecular sieve can be replaced in accordance with techniques well known in the art (e.g., by ion exchange) with other cations. Replacing cations can include metal ions, hydrogen ions, hydrogen precursor (e.g., ammonium) ions, and mixtures thereof. Particularly preferred replacing cations are those which tailor the catalytic activity for certain organic conversion reactions. These include hydrogen, rare earth metals, and metals of Groups 2 to 15 of the Periodic Table of the Elements.

Characterization of the Molecular Sieve

In its as-synthesized and anhydrous form, molecular sieve SSZ-117 can have a chemical composition comprising the following molar relationship set forth in Table 2:

TABLE 2

|  | Typical | Preferred |
|---|---|---|
| $TO_2/Al_2O_3$ | ≥30 | ≥50 |
| $Q^+/TO_2$ | >0 to 0.1 | >0 to 0.1 | wherein T is a tetravalent element comprising silicon and germanium; and $Q^+$ comprises N,N,N,3,5-pentamethyladamantan-1-ammonium cations. In some aspects, the molecular sieve can have a $SiO_2/GeO_2$ molar ratio in a range of 4 to 12 (e.g., 6 to 10).

It should be noted that the as-synthesized form of the present molecular sieve may have molar ratios different from the molar ratios of reactants of the reaction mixture used to prepare the as-synthesized form. This result may occur due to incomplete incorporation of 100% of the reactants of the reaction mixture into the crystals formed (from the reaction mixture).

In its calcined form, molecular sieve SSZ-117 can have a chemical composition comprising the following molar relationship:

$$Al_2O_3:(n)TO_2$$

wherein n is ≥30 (e.g., 30 to 500, ≥50, 50 to 250, or 50 to 150); and T is a tetravalent element comprising silicon and germanium.

Molecular sieve SSZ-117 is characterized by a powder XRD pattern, which, in the as-synthesized form of the molecular sieve, includes at least the peaks set forth in Table 3, and which, in the calcined form of the molecular sieve, includes at least the peaks set forth in Table 4.

TABLE 3

| Characteristic Peaks for As-Synthesized SSZ-117 | | |
|---|---|---|
| 2-Theta [°] | d-Spacing [Å] | Relative Intensity |
| 7.80 | 11.33 | VS |
| 9.15 | 9.66 | W |
| 10.13 | 8.73 | W |
| 11.45 | 7.72 | VS |

TABLE 3-continued

Characteristic Peaks for As-Synthesized SSZ-117

| 2-Theta [°] | d-Spacing [Å] | Relative Intensity |
|---|---|---|
| 14.97 | 5.91 | W |
| 15.63 | 5.67 | W |
| 17.15 | 5.17 | M |
| 18.12 | 4.89 | M |
| 18.70 | 4.74 | M |
| 19.21 | 4.62 | W |
| 19.63 | 4.52 | W |

TABLE 4

Characteristic Peaks for Calcined SSZ-117

| 2-Theta [°] | d-Spacing [Å] | Relative Intensity |
|---|---|---|
| 7.88 | 11.21 | VS |
| 9.14 | 9.67 | M |
| 10.23 | 8.64 | M |
| 11.24 | 7.87 | S |
| 14.95 | 5.92 | W |
| 15.63 | 5.67 | W |
| 17.41 | 5.09 | W |
| 18.19 | 4.87 | M |
| 18.43 | 4.81 | W |
| 19.35 | 4.59 | W |
| 19.74 | 4.49 | W |

As will be understood by those of skill in the art, the determination of the parameter 2-theta (2θ) is subject to both human and mechanical error, which in combination can impose an uncertainty of about ±0.30° on each reported value of 2-theta. The relative intensity (100×I/I$_o$) is recorded as the ratio of the peak intensity to that of the most intense peak, which is assigned a value of 100. The relative intensities of the d-spacings are indicated by the notations VS, S, M, and W which represent very strong, strong, medium, and weak, respectively. In terms of relative intensity, the above designations are defined as: W (weak)<20; M (medium) is >20 and <40; S (strong) is 40 and <60; and VS (very strong) is 60. When the intensity is near the endpoint for a range, the intensity may be characterized as being in either of the ranges. For example, intensities of 18-22 may be listed as W-M. However, due to variations in intensity of the lines, as known in the art, one or more of the lines may have an intensity that is in an adjacent range.

The powder X-ray diffraction patterns presented herein were collected by standard techniques. The radiation was CuKα radiation. The peak heights and the positions, as a function of 2θ where θ is the Bragg angle, were read from the relative intensities of the peaks (adjusting for background), and d, the interplanar spacing corresponding to the recorded lines, can be calculated.

Minor variations in the diffraction pattern can result from variations in the mole ratios of the framework species of the sample due to changes in lattice constants. In addition, disordered materials and/or sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

Sorption and Catalysis

Molecular sieve SSZ-117 (where part or all of Q$^+$ is removed) may be used as a sorbent or as a catalyst to catalyze a wide variety of organic compound conversion processes including many of present commercial/industrial importance. Examples of chemical conversion processes which are effectively catalyzed by SSZ-117, by itself or in combination with one or more other catalytically active substances including other crystalline catalysts, include those requiring a catalyst with acid activity. Examples of organic conversion processes which may be catalyzed by SSZ-117 include cracking, hydrocracking, disproportionation, alkylation, oligomerization, aromatization, and isomerization.

As in the case of many catalysts, it may be desirable to incorporate SSZ-117 with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring, or in the form of gelatinous precipitates or gels, including mixtures of silica and metal oxides. Use of a material in conjunction with SSZ-117 (i.e., combined therewith or present during synthesis of the new material) which is active, tends to change the conversion and/or selectivity of the catalyst in certain organic conversion processes. Inactive materials suitably serve as diluents to control the amount of conversion in a given process so that products can be obtained in an economic and orderly manner without employing other means for controlling the rate of reaction. These materials may be incorporated into naturally occurring clays (e.g., bentonite and kaolin) to improve the crush strength of the catalyst under commercial operating conditions. These materials (i.e., clays, oxides, etc.) function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with SSZ-117 include the montmorillonite and kaolin family, which families include the sub-bentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with SSZ-117 also include inorganic oxides, such as silica, zirconia, titania, magnesia, beryllia, alumina, and mixtures thereof.

In addition to the foregoing materials, SSZ-117 can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of SSZ-117 and inorganic oxide matrix may vary widely, with the SSZ-117 content ranging from 1 to 90 wt. % (e.g., 2 to 80 wt. %) of the composite.

EXAMPLES

The following illustrative examples are intended to be non-limiting.

Example 1

Synthesis of N,N,N,3,5-Pentamethyladamantan-1-ammonium Hydroxide 3,5-Dimethyladamantan-1-amine was permethylated by treatment with a greater than 3-fold excess of methyl iodide and 2 equivalents of potassium bicarbonate in methanol over several days. The reaction mixture was concentrated under reduced pressure and the resulting solids were extracted 2 times with chloroform. The crude product was recovered by rotary evaporation of the chloroform under reduced pressure. The crude product was recovered by stripping off the chloroform. The crude product was heated in a minimum amount of 95% ethanol at 70° C. to produce a clear solution. The solution was allowed to cool to room temperature to provide the iodide salt as very clean crystals.

The resulting iodide salt was exchanged to the corresponding hydroxide salt by stirring it with hydroxide exchange resin (AMBERLITE© IRN78) in deionized water overnight. The solution was filtered, and the filtrate was analyzed for hydroxide concentration by titration of a small sample with a standard solution of 0.1 N HCl.

Example 2

Synthesis of SSZ-117

Into a tared 23 mL Parr reactor was added 0.27 g of Tosoh 390HUA Y-zeolite ($SiO_2/Al_2O_3$ molar ratio ~300), 0.05 g of $GeO_2$ and 2.5 mmoles of an aqueous N,N,N,3,5-pentamethyladamantan-1-ammonium hydroxide solution. The reactor was then placed in a vented hood and water was allowed to evaporate to bring the $H_2O/(SiO_2+GeO_2)$ molar ratio to 7 (as determined by the total mass of the suspension). Then, HF (2.5 mmoles) was added and the reactor was heated to 160° C. with tumbling at 43 rpm for about 7 days. The solid products were recovered by centrifugation, washed with deionized water and dried at 95° C.

Powder XRD showed the product to be a pure form of a new phase, designated SSZ-117.

Example 3

Calcination of SSZ-117

The as-synthesized molecular sieve of Example 1 was calcined inside a muffle furnace under a flow of air heated to 550° C. at a rate of 1° C./minute and held at 550° C. for 5 hours, cooled and then analyzed by powder XRD.

Powder XRD of the calcined material indicated that the material remains stable after calcination to remove the structure directing agent.

Example 4

Micropore Volume Analysis

Analysis of the calcined form of SSZ-117 by the t-plot method of nitrogen physisorption shows the sample possesses a micropore volume of 0.11 cm³/g.

Example 5

Uptake of Diisopropyl Azodicarboxylate

Micropore characterization of SSZ-117 was evaluated spectrophotometrically by uptake of the chromophore diisopropyl azodicarboxylate (DIAD), according to the method described by L-T. Yuen et al. (Micropor. Mater. 1997, 12, 229-249). Molecular sieves were used in their hydrogen form.

Each molecular sieve was pressed in a dye to 2000 psi and the pellet broken and meshed (24-40) before drying in a furnace at 575° F. for 2-4 hours just prior to use. The sample was removed, placed in a dessicator and allowed to cool. Meshed material (60 mg) was weighed out rapidly and placed in the pre-calibrated spectroscopy system.

A solution of DIAD in spectral grade isooctane (0.127 g DIAD/70 mL isooctane), corresponding to an absorbance of 0.45 at 406 nm ($A_{max}$), was recirculated through the zeolite hold basket in the spectroscopy system every 23 seconds. Data were acquired continuously. Runs were carried out at ambient temperature and for a duration of 18 hours, at which time almost all experiments had reached an uptake equilibrium, where no further changes in absorbance were observed.

UV-Vis Data were recorded using an Agilent Technologies Cary 8454 UV-Visible Diode Array Spectrophotometer monitoring from 190-500 nm. Absorbance measurements were conducted using 1-cm pathlength cuvettes. Isooctane was first run as a blank as it does not exhibit absorbance between 190-500 nm.

Table 5 summarizes the uptake of DIAD in SSZ-117 and several other molecular sieves of known structure.

TABLE 5

| Molecular Sieve | Pore Size Type | % DIAD Removed |
|---|---|---|
| SSZ-13 (CHA) | Small (3-D) | None |
| ZSM-5 (MFI) | Medium (3-D) | 40% |
| LZ-210 (FAU) | Large (3-D) | 90% |
| SSZ-117 | Unknown | 25% |

Example 6

Brønsted Acidity

Brønsted acidity of the molecular sieve was determined by n-propylamine temperature-programmed desorption (TPD) adapted from the published descriptions by T. J. Gricus Kofke et al. (J. Catal. 1988, 114, 34-45); T. J. Gricus Kofke et al. (J. Catal. 1989, 115, 265-272); and J. G. Tittensor et al. (J. Catal. 1992, 138, 714-720). A sample was pre-treated at 400° C.-500° C. for 1 hour in flowing dry $H_2$. The dehydrated sample was then cooled down to 120° C. in flowing dry helium and held at 120° C. for 30 minutes in a flowing helium saturated with n-propylamine for adsorption. The n-propylamine-saturated sample was then heated up to 500° C. at a rate of 10° C./minute in flowing dry helium. The Brønsted acidity was calculated based on the weight loss vs. temperature by thermogravimetric analysis (TGA) and effluent $NH_3$ and propene by mass spectrometry. The sample had a Brønsted acidity of 77.72 µmol/g, indicating that aluminum sites are incorporated into the framework of the molecular sieve.

Example 7

Example 2 was repeated except that CBV-780 Y-zeolite ($SiO_2/Al_2O_3$ molar ratio=80; Zeolyst International) was used as the FAU source. Powder XRD showed the product to be SSZ-117.

Example 8

Example 2 was repeated except that CBV-760 Y-zeolite ($SiO_2/Al_2O_3$ molar ratio=60; Zeolyst International) was used as the FAU source. The powder XRD pattern of the product showed the product to be SSZ-117.

A SEM image of the product is shown in FIG. 1 indicating a uniform field of crystals.

The product had a Brønsted acidity of ~200 µmol/g.

Example 9

Example 2 was repeated except that CBV-720 Y-zeolite ($SiO_2/Al_2O_3$ molar ratio=30; Zeolyst International) was used as the FAU source. Powder XRD showed the product to be SSZ-117.

Elemental analysis showed that the product had a silicon content of 30 wt. %, a germanium content of 10.1 wt. %, an aluminum content of 1.12 wt. %, a Si/Ge molar ratio of 7.5, and a $(SiO_2+GeO_2)/Al_2O_3$ molar ratio of 59.

The invention claimed is:

1. A molecular sieve having, in its calcined form, a powder X-ray diffraction pattern including the following peaks:

| 2-Theta [±0.30°] | d-Spacing [Å] | Relative Intensity |
|---|---|---|
| 7.88 | 11.21 | VS |
| 9.14 | 9.67 | M |
| 10.23 | 8.64 | M |
| 11.24 | 7.87 | S |
| 14.95 | 5.92 | W |
| 15.63 | 5.67 | W |
| 17.41 | 5.09 | W |
| 18.19 | 4.87 | M |
| 18.43 | 4.81 | W |
| 19.35 | 4.59 | W |
| 19.74 | 4.49 | W. |

2. The molecular sieve of claim 1, and having a composition comprising the molar relationship:

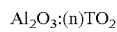

$Al_2O_3$:(n)$TO_2$ wherein n is ≥30; and T is a tetravalent element comprising silicon and germanium.

3. The molecular sieve of claim 1, and having a composition comprising the molar relationship:

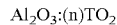

$Al_2O_3$:(n)$TO_2$ wherein n is ≥50; and T is a tetravalent element comprising silicon and germanium.

4. A molecular sieve having, in its as-synthesized form, a powder X-ray diffraction pattern including the following peaks:

| 2-Theta [±0.30°] | d-Spacing [Å] | Relative Intensity |
|---|---|---|
| 7.80 | 11.33 | VS |
| 9.15 | 9.66 | W |
| 10.13 | 8.73 | W |
| 11.45 | 7.72 | VS |
| 14.97 | 5.91 | W |
| 15.63 | 5.67 | W |
| 17.15 | 5.17 | M |
| 18.12 | 4.89 | M |
| 18.70 | 4.74 | M |
| 19.21 | 4.62 | W |
| 19.63 | 4.52 | W. |

5. The molecular sieve of claim 4, having a chemical composition comprising the following molar relationship:

| | |
|---|---|
| $TO_2/Al_2O_3$ | ≥30 |
| $Q^+/TO_2$ | >0 to 0.1 | wherein T is a tetravalent element comprising silicon and germanium; and $Q^+$ comprises N,N,N,3,5-pentamethyladamantan-1-ammonium cations.

6. The molecular sieve of claim 4, having a chemical composition comprising the following molar relationship:

| | |
|---|---|
| $TO_2/Al_2O_3$ | ≥50 |
| $Q^+/TO_2$ | >0 to 0.1 | wherein T is a tetravalent element comprising silicon and germanium; and $Q^+$ comprises N,N,N,3,5-pentamethyladamantan-1-ammonium cations.

7. A method of synthesizing the molecular sieve of claim 4, the method comprising:
(a) providing a reaction mixture comprising:
 (1) a FAU framework type zeolite;
 (2) a source of germanium;
 (3) N,N,N,3,5-pentamethyladamantan-1-ammonium hydroxide (Q);
 (4) a source of fluoride ions; and
 (5) water; and
(b) subjecting the reaction mixture to crystallization conditions sufficient to form crystals of the molecular sieve.

8. The method of claim 7, wherein the reaction mixture has a composition, in terms of molar ratios, as follows:

| | |
|---|---|
| $TO_2/Al_2O_3$ | 30 to 600 |
| $Q/TO_2$ | 0.10 to 1.00 |
| $F/TO_2$ | 0.10 to 1.00 |
| $H_2O/TO_2$ | 2 to 10 | wherein T is a tetravalent element comprising silicon and germanium.

9. The method of claim 7, wherein the reaction mixture has a composition, in terms of molar ratios, as follows:

| | |
|---|---|
| $TO_2/Al_2O_3$ | 60 to 500 |
| $Q/TO_2$ | 0.20 to 0.70 |
| $F/TO_2$ | 0.20 to 0.70 |
| $H_2O/TO_2$ | 4 to 8 | wherein T is a tetravalent element comprising silicon and germanium.

10. The method of claim 7, wherein the FAU framework type zeolite is zeolite Y.

11. The method of claim 7, wherein the crystallization conditions include a temperature of from 125° C. to 200° C.

12. The method of claim 7, wherein the reaction mixture has a Q/F molar ratio in a range of 0.8 to 1.2.

13. A process for converting a feedstock comprising an organic compound to a conversion product, the process comprising contacting the feedstock at organic compound conversion conditions with a catalyst comprising the molecular sieve of claim 1.

\* \* \* \* \*